US008886856B1

(12) United States Patent
Mendel (10) Patent No.: US 8,886,856 B1
(45) Date of Patent: Nov. 11, 2014

(54) METHODS AND APPARATUS FOR COMMUNICATING LOW-LATENCY WORD CATEGORY OVER MULTI-LANE LINK

(75) Inventor: David W. Mendel, Sunnyvale, CA (US)

(73) Assignee: Altera Corporation, San Jose, CA (US)

(*) Notice: Subject to any disclaimer, the term of this patent is extended or adjusted under 35 U.S.C. 154(b) by 119 days.

(21) Appl. No.: 13/165,762

(22) Filed: Jun. 21, 2011

(51) Int. Cl.
*G06F 3/00* (2006.01)
*G06F 13/28* (2006.01)
*G06F 13/00* (2006.01)
*G06F 13/12* (2006.01)
*G06F 13/38* (2006.01)

(52) U.S. Cl.
USPC .................... 710/62; 710/20; 710/26; 710/34

(58) Field of Classification Search
USPC .......................................... 710/62, 20, 26, 34
See application file for complete search history.

(56) References Cited

U.S. PATENT DOCUMENTS

| | | | | |
|---|---|---|---|---|
| 5,995,518 A * | 11/1999 | Burns et al. | ................... | 370/503 |
| 6,654,824 B1 | 11/2003 | Vila et al. | | |
| 7,007,115 B2 | 2/2006 | Elboim et al. | | |
| 7,466,723 B2 | 12/2008 | Vakil et al. | | |
| 7,500,131 B2 * | 3/2009 | Panikkar et al. | ............. | 713/503 |
| 7,570,659 B2 | 8/2009 | Susnow et al. | | |
| 7,668,979 B1 * | 2/2010 | Wentzlaff | ....................... | 710/33 |
| 7,734,188 B2 | 6/2010 | Kuwata et al. | | |
| 7,814,242 B1 * | 10/2010 | Wentzlaff | ...................... | 710/52 |
| 8,103,809 B1 * | 1/2012 | Michels et al. | .................. | 710/22 |
| 8,155,113 B1 * | 4/2012 | Agarwal | ....................... | 370/386 |
| 2004/0225781 A1 * | 11/2004 | Kotlowski et al. | ............. | 710/200 |
| 2006/0053328 A1 * | 3/2006 | Panikkar et al. | .............. | 713/503 |
| 2006/0158225 A1 * | 7/2006 | Stojanovic et al. | ............. | 326/87 |
| 2007/0008898 A1 * | 1/2007 | Sharma et al. | ................ | 370/252 |
| 2007/0263533 A1 * | 11/2007 | Chiabrera | ...................... | 370/229 |
| 2008/0172501 A1 * | 7/2008 | Goodart et al. | .................. | 710/33 |
| 2009/0184743 A1 * | 7/2009 | Kim et al. | ...................... | 327/161 |
| 2009/0307394 A1 * | 12/2009 | Renaud et al. | .................. | 710/54 |
| 2010/0077097 A1 | 3/2010 | Brown et al. | | |
| 2012/0039604 A1 * | 2/2012 | Dickens et al. | ................. | 398/46 |

OTHER PUBLICATIONS

Interlaken Protocol Definition—A Joint Specification of Cortina Systems and Cisco Systems, Revision 1.2, Oct. 7, 2008, pp. 1-52, Proprietary Material—Cortina Systms Inc. and Cisco Systems, Inc. 2006-2008.

* cited by examiner

*Primary Examiner* — Idriss N Alrobaye
*Assistant Examiner* — Getente A Yimer
(74) *Attorney, Agent, or Firm* — Okamoto Benedicto LLP (57) ABSTRACT

One embodiment relates to an integrated circuit configured to communicate a low-latency word category over a multi-lane link. A transmitter controller is configured to transmit words belonging to the low-latency word category only over a designated lane of the multi-lane link and to transmit words belonging to non-low-latency word categories over any available lane of the multi-lane link. A receiver controller may be configured to determine a word category of a word received over the designated lane and, if the word category is determined to be the low-latency word category, then read the word from the designated lane before lane-to-lane deskew is completed. Other embodiments, aspects, and features of the invention are also disclosed.

25 Claims, 11 Drawing Sheets

**FIG. 2
(Conventional)**   200

| Lane 1 | Lane 2 | Lane 3 | Lane 4 |
|--------|--------|--------|--------|
| D1     | D2     | D3     | D4     |
| D5     | C1     | C2     | D6     |
| D7     | D8     | D9     | D10    |
| C3     | D11    | D12    | D13    |
| D14    | D15    | C4     | C5     |
| D16    | D17    | D18    | D19    |
| ⋮      | ⋮      | ⋮      | ⋮      |

Lower in queue (to be transmitted later) →

**FIG. 3
(Conventional)**

Receiving method for designated lane
(e.g., lane 1)

FIG. 6A          600

Receiving method for other lanes
(e.g., lane n, where n = 2, 3, or 4)

METHODS AND APPARATUS FOR COMMUNICATING LOW-LATENCY WORD CATEGORY OVER MULTI-LANE LINK

TECHNICAL FIELD

The present invention relates generally to the transfer of data in data processing systems. More particularly, the present invention relates to the transfer of data across multi-lane communication links wherein the transmission times of the respective lanes may be different.

DESCRIPTION OF THE BACKGROUND ART

Electronic components within a system may use serializer/de-serializer circuitry to transmit data by way of high-speed serial links. Such high-speed serial links allow for point-to-point data transfers to be made without the need to obtain access to a shared parallel bus.

In order to increase the available bandwidth of a point-to-point link, multiple serial lanes may be included in the link. However, while the lanes of the link typically transmit symbols simultaneously, a difference in the arrival time may occur at the receiver, for example. The arrival time difference may be referred to as lane-to-lane skew. Sources of lane-to-lane skew may include chip input/output drivers and receivers, printed wiring boards, electrical and optical cables, serialization and de-serialization logic, and other components.

SUMMARY

One embodiment relates to an integrated circuit configured to communicate a low-latency word category over a multi-lane link. A transmitter controller is configured to transmit words belonging to the low-latency word category only over a designated lane of the multi-lane link and to transmit words belonging to non-low-latency word categories over any available lane of the multi-lane link. A receiver controller may be configured to determine a word category of a word received over the designated lane and, if the word category is determined to be the low-latency word category, then read the word from the designated lane before lane-to-lane deskew is completed.

Another embodiment relates to a method of utilizing a multi-lane link. Words belonging to a predetermined word category are transmitted only over a designated lane of the multi-lane link. Words belonging to other word categories, besides the predetermined category, are striped onto any available lane for transmission over the multi-lane link. A word category of a word received over the designated lane may be determined and, if the word category is determined to be the predetermined word category, then the word may be read from the designated lane before lane-to-lane deskew is completed.

Another embodiment relates to a circuit configured for low-latency communication of a predetermined word category over a bi-directional multi-lane link. A receiver controller is configured to determine a word category of a word received over a lane and, if the word category is determined to be the predetermined word category, then read the word from the lane before lane-to-lane deskew is completed.

Other embodiments, aspects, and features are also disclosed.

BRIEF DESCRIPTION OF THE DRAWINGS

FIG. IA depicts an exemplary one-way multi-lane point-to-point link in accordance with one embodiment of the present invention.

DETAILED DESCRIPTION

Current multi-lane point-to-point communication protocols generally require buffering of each lane and aggregated logic for the purpose of providing lane-to-lane deskew. The semantic meaning of the data is discerned only after the lane-to-lane deskew.

Applicant has determined that the need to perform lane-to-lane deskew at the receiver before interpreting the transmitted data may be disadvantageous or problematic in certain system applications. In particular, it may be necessary or desirable to communicate certain control information from point to point with very low latency. For example, it may be desirable to provide XON/XOFF information with minimal latency in order to reduce the buffering requirement. In another example, it may be desirable to provide ACK/NACK (Acknowledge/Negative acknowledge) messages with minimal latency.

The present patent application discloses several advantageous techniques for communicating a predetermined category of words, such as certain control codes, across a multi-lane point-to-point link with minimal or reduced latency. In accordance with one embodiment, a single lane may be designated for use in transmitting the word category across the link. The lane may be so designated based on, for example, auto-negotiation between the transmitter and receiver, or by a determination of which lane has the lowest latency (which may not be known a priori). It is appreciated that while the use of a single lane increases the transmit latency for the word category, the overall latency may be minimized or reduced.

Note that a protocol that uses a single lane of a multi-lane link to transmit control words, or more generally a predetermined word category, is very different from protocols that provide out-of-band control information, such as Interlaken. This is because the out-of-band information is sent on a separate dedicated wire or set of wires. The out-of-band information thus does not have to compete with the regular data for transmission over the multi-lane link.

Some protocols, such as Interlaken or PCI Express generation 3, may need to send lane-specific control data. However, these protocols use this data for lower-level lane management purposes, such as lane-by-lane cyclic redundancy check (CRC), sending a scrambler seed, or passing on lane-by-lane transceiver settings. These protocols do not pass on information on a single lane that is intended for the higher protocol layers, and there is no feature implemented to minimize the latency of this lane-specific information versus the overall goal of lower latency for the multi-lane link as a whole.

The following are definitions for certain terms used in this patent application.

A word is a logical unit of data for a given protocol. For example, in 8b/10b encoding schemes, the transmitted word is 10-bits in length. For 64b/66b encoding schemes (as used in 10 Gigabit Ethernet), the natural word size is 64 bits of data plus one bit of information indicating that the word is either control or data information. Other protocols may have other word sizes.

A data packet carries data for normal information transfer. A data packet may be one or more words in length. Words of a data packet may be referred to as data words.

A control code carries protocol-specific information, such as flow control information or error status. Depending on the protocol, a control code may be one or more words in length. Words of a control code may be referred to as control words. For example, in 8b/10b encoding schemes, the transmitted words is 10-bits in length, which encapsulates 8 bits of data plus an indication whether the indicated word is either control or data information. For 64b/66b encoding schemes (as used, for example, in 10 Gigabit Ethernet), the transmitted word is 66-bits in length, which encapsulates 64 bits of data plus an indication whether the indicated word is either control or data information.

A multi-link lane is a point-to-point link which includes multiple serial lanes. A lane may be unidirectional or bidirectional. A given protocol may stripe data across multiple lanes.

Striping is a process for taking successive words (either data or control) and putting them on one lane, then another, and so on. For example, given a four-lane link, normal striping may distribute a packet made up of seven words as follows: word 1 to lane 1; word 2 to lane 2; word 3 to lane 3; word 4 to lane 4; word 5 to lane 1; word 6 to lane 2; and word 7 to lane 3. If a second packet is sent, its word 1 would start at the next available lane, which is lane 4 in this example.

Figure 1A:
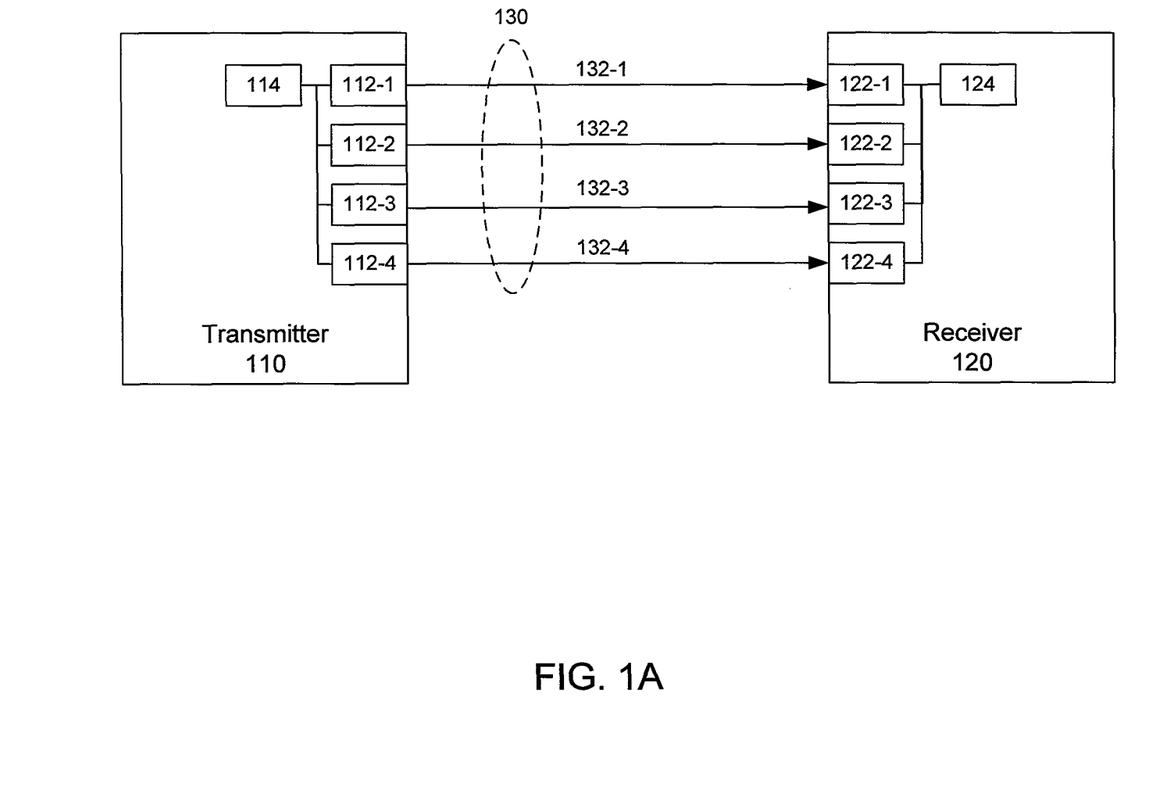

FIG. 1A depicts an exemplary multi-lane point-to-point link 130 in accordance with an embodiment of the invention. As shown, the link 130 goes from a transmitter 110 to a receiver 120. As further shown, the link 130 may comprise multiple lanes, in this example, four lanes (132-1, 132-2, 132-3, and 132-4). Of course, other numbers of lanes may be implemented and showing a four lane structure is merely exemplary and not intended to limit the scope of the present invention. Operations at the transmitter 110 may be controlled by a transmitter controller 114, and operations at the receiver 120 may be controlled by a receiver controller 124.

Serial data may be multiplexed at the transmitter 110 to create multiple serial data streams, one for each lane 132. There may be a first transmission queue 112-1 for the serial data to be transmitted on the first lane 132-1, a second transmission queue 112-2 for the serial data to be transmitted on the second lane 132-2, a third transmission queue 112-3 for the serial data to be transmitted on the third lane 132-3, and a fourth transmission queue 112-4 for the serial data to be transmitted on the fourth lane 132-4. Each queue 112 may be implemented as a first-in-first-out (FIFO) queue, for example.

At the receiver 120, there may be a first FIFO buffer 122-1 for the serial data that is received on the first lane 132-1, a second FIFO buffer 122-2 for the serial data that is received on the second lane 132-2, a third FIFO buffer 122-3 for the serial data that is received on the third lane 132-3, and a fourth FIFO buffer 122-4 for the serial data that is received on the fourth lane 132-4. Each FIFO buffer 122 may be implemented as a FIFO buffer with an individually controllable delay. The receiver 120 may be configured to control the delay for each of the FIFO buffers 122 so as to deskew the serial data streams received on the multiple lanes such that the received data is aligned across the lanes. The receiver 120 may also be configured to de-multiplex the aligned data from the multiple lanes to recreate the original serial data.

Figure 1B:
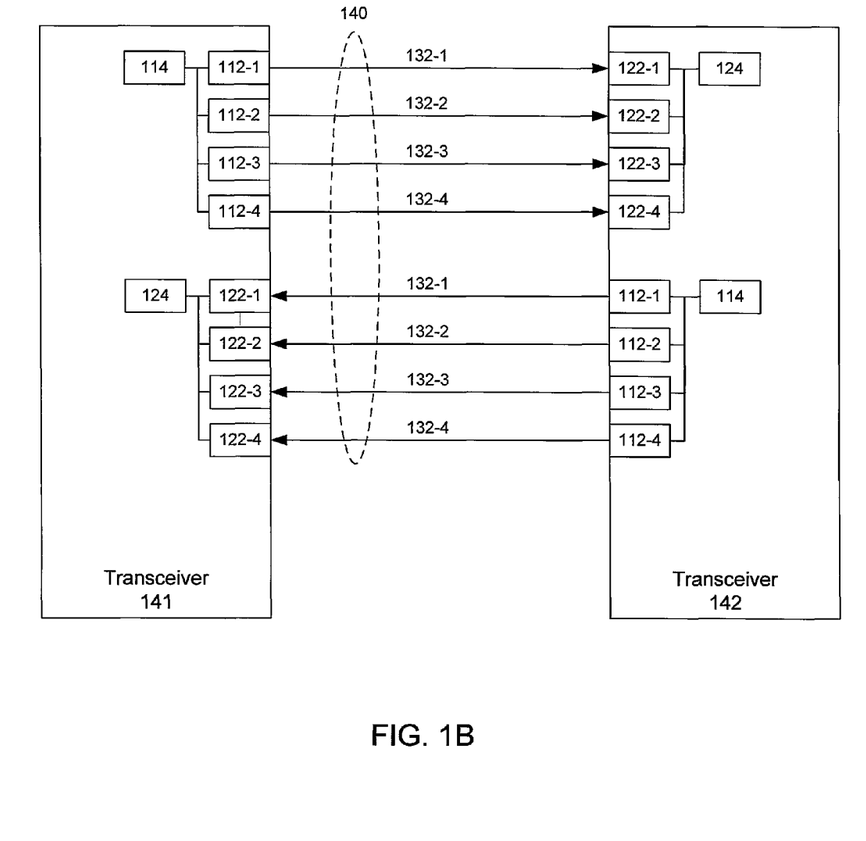
FIG. 1B depicts an exemplary bi-directional multi-lane point-to-point link in accordance with one embodiment of the present invention.

While FIG. 1A shows a one-way link between a transmitter and a receiver, a multi-lane point-to-point link may also be bi-directional between two transceivers. An example of such a bi-directional multi-lane point-to-point link 140 is illustrated in FIG. 1B. As shown, the two-way link 140 is between a first transceiver 141 and a second transceiver 142. As further shown, the link 140 may comprise multiple lanes, in this example, four lanes (132-1, 132-2, 132-3, and 132-4) in each direction. Of course, other numbers of lanes may be implemented, and the number of lanes in each direction need not be the same. Accordingly, the number of lanes used here is merely exemplary and not intended to limit the scope of the present invention. Transmission operations at the transceiver (141 and 142) may be controlled by a transmitter controller 114, and reception operations at the each transceiver (141 and 142) may be controlled by a receiver controller 124.

Figure 2:
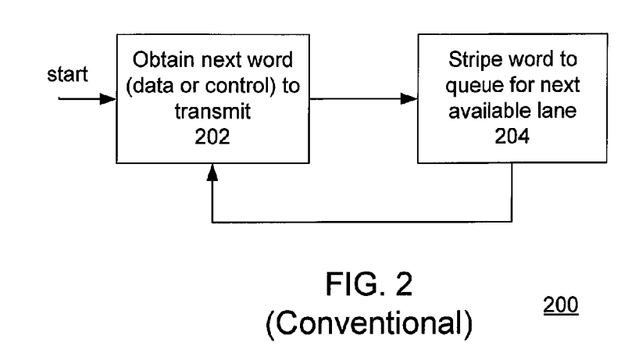
FIG. 2 is an exemplary flow chart showing a conventional method for the transmission of words across a multi-lane link.

FIG. 2 is a flow chart showing a conventional method 200 for the transmission of words across a multi-lane link. As shown, a transmitter obtains 202 a next word to be transmitted across the multi-lane link. The word may be either a data word or a control word. The word may be striped 204 across the transmission queues for the next available lanes. The method 200 may then loop back to obtain 202 the next word to be transmitted, and so forth.

Figure 3:
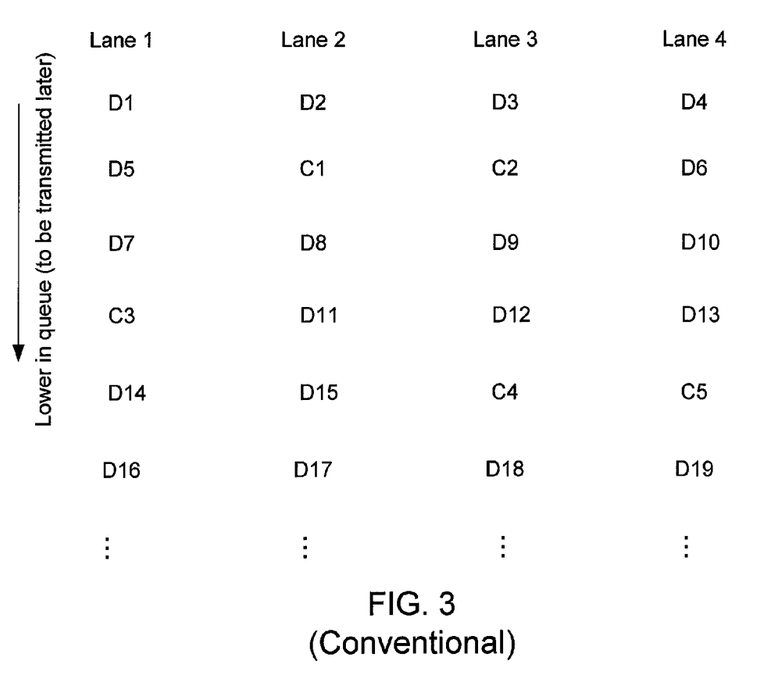
FIG. 3 illustrates an example showing the conventional method of FIG. 2 being applied to the transmission of words across a four-lane link.

FIG. 3 illustrates an example showing the conventional method 200 of FIG. 2 being applied to the transmission of words across a four-lane link. In this example, the four lanes are denoted Lane 1, Lane 2, Lane 3 and Lane 4.

Data words are denoted D1, D2, D3, D4, D5, and so on. D1 is the first data word to be transmitted; D2 is the second data word to be transmitted; D3 is the third data word to be transmitted; and so forth. Control words are denoted C1, C2, C3, C4, and so on. C1 is the first control word to be transmitted; C2 is the second control word to be transmitted; C3 is the third control word to be transmitted; and so forth.

For the example depicted in FIG. 3, prior to multiplexing the serial stream at the transmitter across the multiple lanes, the serial stream may have words in this order: D1; D2; D3; D4; D5; C1; C2; D6; D7; D8; D9; D10; C3; D11; D12; D13; D14; D15; C4; C5; D16; D17; D18; D19; . . . . Regarding the control words, for example, C1 and C2 may belong to a two-word control code, C3 may be a one-word control code, and C4 and C5 may belong to another two-word control code.

As shown in FIG. 3, the words of the serial stream to be transmitted are striped to the queues for the next available lanes per block 204 of FIG. 2. In a first cycle, the first four words (D1, D2, D3 and D4) of the serial stream are striped to the queues of the next available lanes as follows: D1 is input to the queue for Lane 1; D2 is input to the queue for Lane 2; D3 is input to the queue for Lane 3; and D4 is input to the queue for Lane 4. In a second cycle, the next four words (D5, C1, C2 and D6) of the serial stream are striped to the queues of the next available lanes as follows: D5 is input to the queue for Lane 1; C1 is input to the queue for Lane 2; C2 is input to the queue for Lane 3; and D6 is input to the queue for Lane 4. In a third cycle, the next four words (D7, D8, D9, and D10) of the serial stream are striped to the queues of the next available lanes as follows: D7 is input to the queue for Lane 1; D8 is input to the queue for Lane 2; D9 is input to the queue for Lane 3; and D10 is input to the queue for Lane 4. And so on for further cycles. For each cycle, a next four words of the serial stream are input to the queues of the four lanes.

Figure 4:
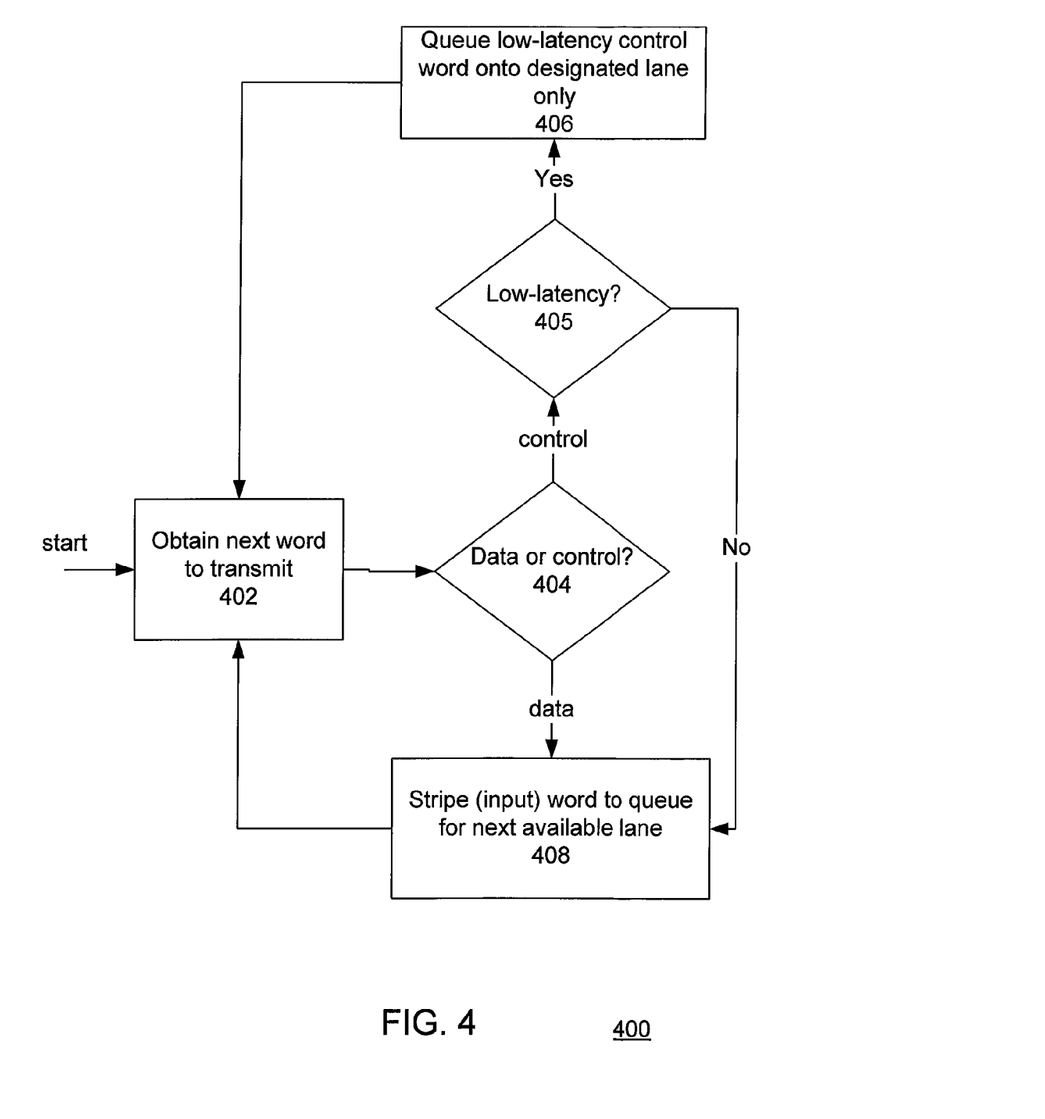
FIG. 4 is an exemplary flow chart showing a method for the transmission of words across a multi-lane link in accordance with an embodiment of the invention.

FIG. 4 is a flow chart showing a method 400 for the transmission of words across a multi-lane link in accordance with an embodiment of the invention. A transmitter controller 114 may be configured to perform the method 400. Unlike the conventional method 200 of FIG. 2, the method 400 of FIG. 4 distinguishes between control words designated as low-latency control words and non-low-latency words (including data words and non-low-latency control words) for the purpose of determining upon which lane to send the word. More generally, the method 400 may distinguish between a predetermined word category (such as the control words designated as low-latency control words) and other words in determining upon which lane to send the word.

As shown, a transmitter controller obtains 402 a next word to be transmitted across the multi-lane link. A word may include one or more symbols and may be either a data word or a control word.

The transmitter controller may then make a determination 404 as to whether the word is a data word or a control word. The word may be encoded such that the preamble of the word may be examined to determine whether the word is data or control. For example, if the word is encoded using a 64 bit to 66 bit (64b/66b) encoding scheme of 10 Gigabit Ethernet, then the first two (preamble) bits may be examined. If the first two bits are "01", then the word is a data word, and the following 64 bits are data. If the first two bits are "10", then the word is a control word, and the following 8 bits provide a control type.

If the word is a control word, then a further determination 405 may be made as to whether the control word is a low-latency control word. Such low-latency control words may be a predetermined subset of the control words. Examples of non-low-latency control words may include, for example, start of packet (SOP) and end of packet (EOP) control words.

If the word is a low-latency control word, then the low-latency control word is queued (input to the queue) 406 onto a lane that is designated for the transmission of low-latency control words. In the four-lane example discussed below in relation to FIG. 5, the designated lane is the first lane (Lane 1). Note that the designated lane may also transmit data words. In this embodiment, however, besides the designated lane, none of the other lanes transmit control words.

If the word is not a low-latency control word, then the word is striped 408 to the queue for the next available lane. If a low-latency control word is already slotted in the designated lane for a particular round, then that lane is skipped, and the word is input to the queue of the next available (i.e. non-designated) lane for that round. Put another way, if the designated lane is already occupied by a low-latency control word, then the designated lane is not available.

Figure 5:
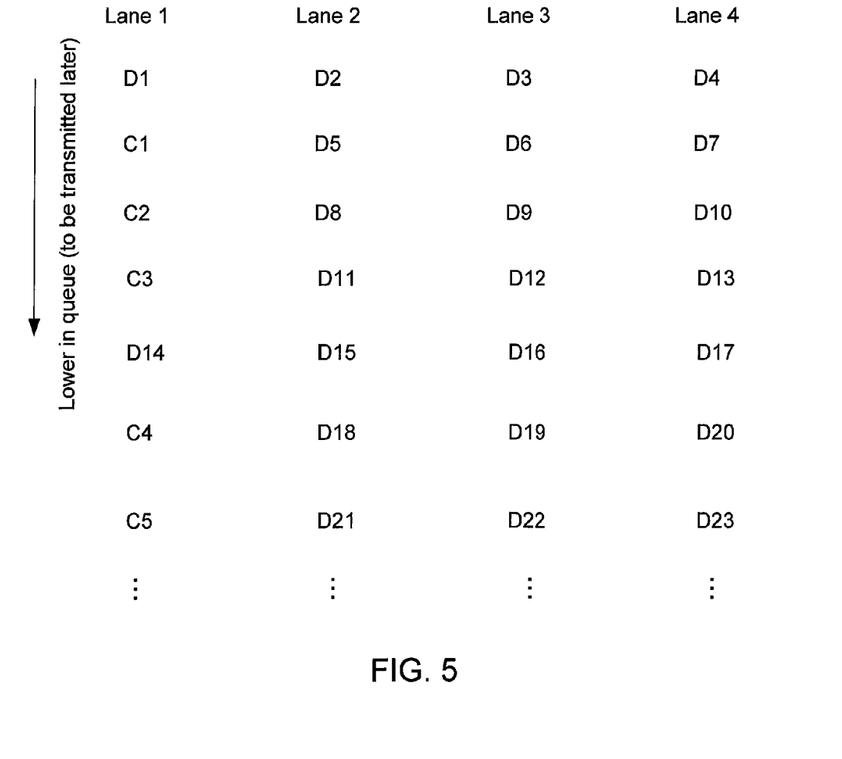
FIG. 5 illustrates an example showing the method of FIG. 4 being applied to the transmission of data and low-latency control words across a four-lane link in accordance with an embodiment of the invention.

FIG. 5 illustrates an example showing the method 400 of FIG. 4 being applied to the transmission of words across a four-lane link in accordance with an embodiment of the invention. Similar to FIG. 3, the four lanes in FIG. 5 are denoted Lane 1, Lane 2, Lane 3 and Lane 4. However, one of the lanes in FIG. 5 is designated for the transmission of low-latency control words. In this example, the designated lane is Lane 1.

Similar to FIG. 3, the data words are denoted D1, D2, D3, D4, D5, and so on. D1 is the first data word to be transmitted; D2 is the second data word to be transmitted; D3 is the third data word to be transmitted; and so forth. The control words are denoted C1, C2, C3, C4, and so on. It is assumed, in this example, that each of the control words (C1, C2, C3, C4, and so on) are low-latency control words. (As described above in relation to FIG. 4, non-low-latency control words would be transmitted in a manner similarly to data words.) C1 is the first low-latency control word to be transmitted; C2 is the second low-latency control word to be transmitted; C3 is the third low-latency control word to be transmitted; and so forth.

Also similar to FIG. 3, prior to multiplexing the serial stream at the transmitter across the multiple lanes, the serial stream may have the words in this order: D1; D2; D3; D4; D5; C1; C2, D6; D7; D8; D9; D10; C3; D11; D12; D13; D14; D15; C4; C5; D16; D17; D18; D19; . . . . Regarding the low-latency control words, for example, C1 and C2 may belong to a two-word low-latency control code, C3 may be a one word low-latency control code, and C4 and C5 may belong to another two-word low-latency control code.

In this case, as shown in FIG. 5, the low-latency control words are queued only onto Lane 1 (the designated lane) per block 406 of FIG. 4, while the data words may be queued onto any of the lanes per block 408 of FIG. 4. In this particular example, in a first cycle, the first four words (D1, D2, D3 and D4) of the serial stream are striped to the queues of the next available lanes as follows: D1 is input to the queue for Lane 1; D2 is input to the queue for Lane 2; D3 is input to the queue for Lane 3; and D4 is input to the queue for Lane 4. In a second cycle, the low-latency control word C1 may be queued onto Lane 1 (the designated lane), while the data words D5, D6 and D7 may be queued onto Lanes 2, 3 and 4, respectively. In a third cycle, the low-latency control word C2 may be queued onto Lane 1, while the data words D8, D9 and D10 are queued onto Lanes 2, 3 and 4, respectively. And so forth, as depicted in FIG. 5.

Comparing FIG. 5 to FIG. 3, it is seen that the low-latency control words in FIG. 5 are queued only on the designated lane (Lane 1, in this example). This causes some low-latency control words to be transmitted in a later cycle in FIG. 5 than in FIG. 3. For example, the low-latency control words C2 and C5 are each transmitted one cycle later in FIG. 5 than in FIG. 3. Hence, the transmission latency for some of the low-latency control words may be longer per the method 400 of FIG. 4. It is, however, appreciated that despite the transmission latency being longer, the end-to-end latency may be shorter due to the substantially reduced latency at the receiver, as discussed below.

Figure 6A:
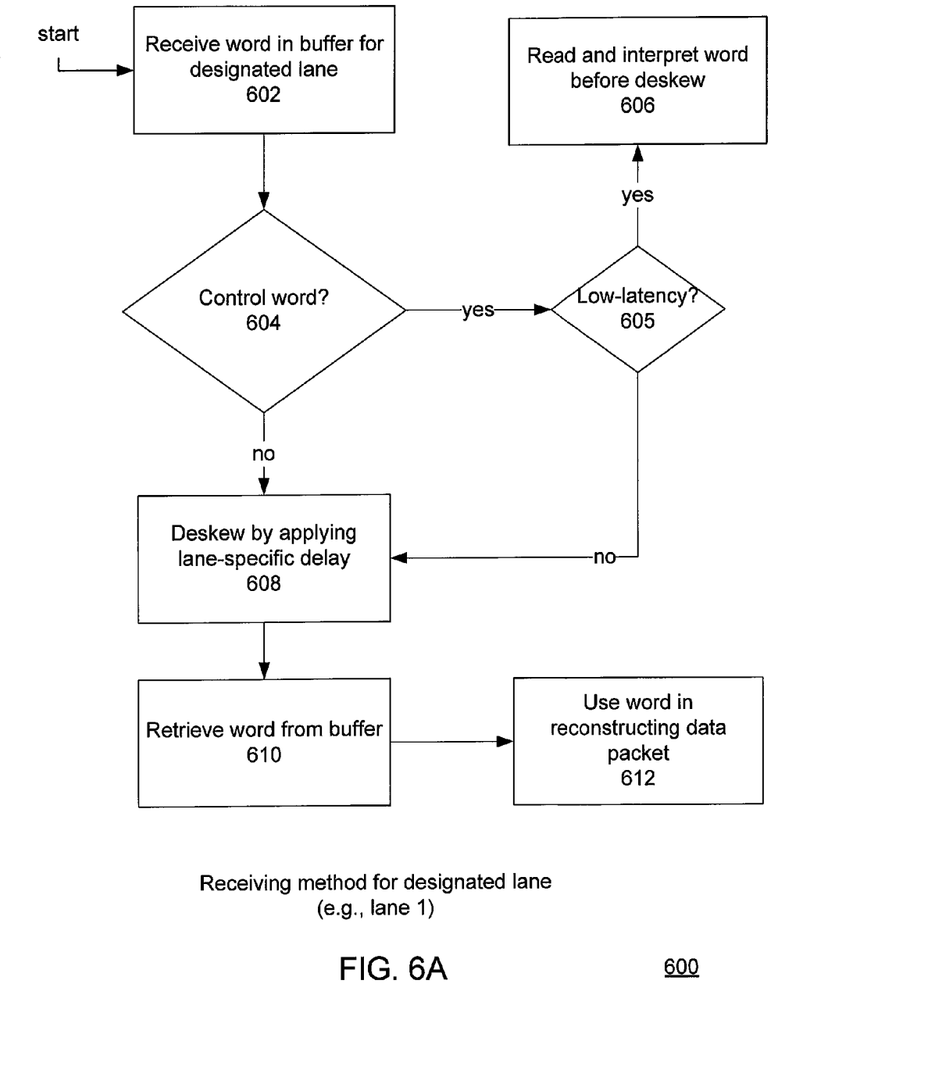
FIG. 6A is an exemplary flow chart depicting a method of receiving words that are transmitted over a designated lane of a multi-lane link in accordance with an embodiment of the invention.

FIG. 6A is a flow chart depicting a method 600 of receiving control and data words that are transmitted over a designated lane of a multi-lane link in accordance with an embodiment of the invention. A receiver controller 124 may be configured to perform the method 600. This method 600 applies to words received in the designated lane, not to words received in the other (non-designated) lanes. As shown, the method 600 of FIG. 6A distinguishes between control and data words so as to be able to read and interpret the control words with higher priority than the data words.

As shown, a word is received 602 in the buffer for the designated lane. In the example shown in FIG. 5, the designated lane is Lane 1. However, before deskewing the lane delays, a determination 604 may be quickly made as to whether the word is a control or data word. The word may be encoded such that the preamble of the word may be examined to determine whether the word is data or control. For example, if the word is encoded using a 64 bit to 66 bit (64b/66b) encoding scheme of 10 Gigabit Ethernet, then the first two (preamble) bits may be examined.

If the word is determined 604 to be a control word, then a further determination 605 may be made as to whether or not the control word is a low-latency control word. If the control word is further determined 605 to be a low-latency control word, then the method 600 may proceed to pre-emptively read and interpret 606 the control word without waiting until the lane-to-lane deskew is completed. This accelerated reading and interpretation of the control word may be accomplished because all words of a control code are received on a single designated lane. Hence, only word alignment within the single lane is needed, and not lane-to-lane deskew, before a control code can be interpreted.

On the other hand, if the word is determined 604 to be a data word or determined 605 to be a non-low-latency control word, then the method 600 may proceed to apply 608 a lane-specific delay for purposes of lane-to-lane deskewing. Such lane-to-lane deskewing is necessary as words of a data packet may be received on multiple lanes. Thereafter, with words in the lanes aligned, the data word may be then retrieved from the buffer 610 and subsequently used in reconstructing a data packet 612.

Figure 6B:
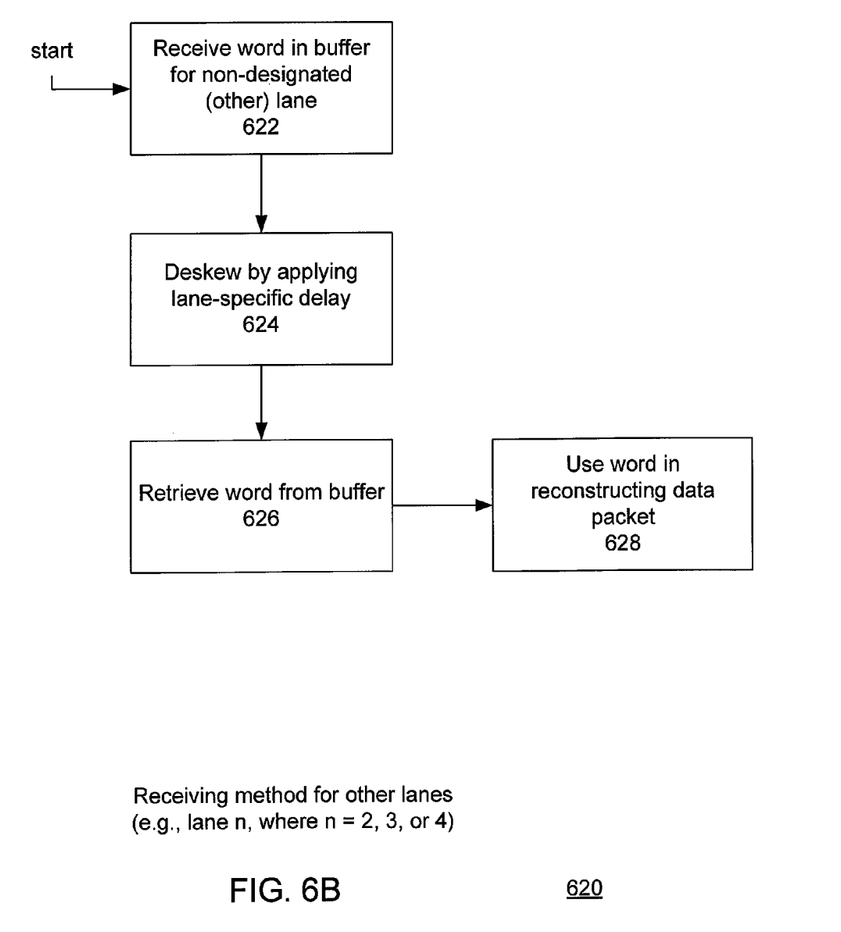
FIG. 6B is an exemplary flow chart depicting a method of receiving words that are transmitted over non-designated lanes of the multi-lane link in accordance with an embodiment of the invention.

FIG. 6B is a flow chart depicting a method 620 of receiving non-low-latency words that are transmitted over non-designated lanes of the multi-lane link in accordance with an embodiment of the invention. A receiver controller 124 may be configured to also perform this method 620. As shown, a data word is received 622 in the buffer for a non-designated lane (i.e. a lane which is not the designated lane). The method 620 may then proceed to apply 624 a lane-specific delay via the associated FIFO buffer 122 for purposes of lane-to-lane deskewing. Such lane-to-lane deskewing is necessary as the non-low-latency words may be received on multiple lanes (including the designated lane and the other lanes). Thereafter, with the words in the lanes aligned, the word may be retrieved 626 from the associated FIFO buffer 122 and subsequently used in reconstructing 628 a data packet. Hence, for a non-designated lane, lane-to-lane deskew logic and buffering needs to be applied before the non-low-latency words may be retrieved and used.

Methods and apparatus for communicating low-latency control words are described above in relation to FIGS. 4, 5, 6A and 6B.

As described above, in one embodiment, the protocol may be such that the low-latency control words include single symbol control words (i.e. single-word control packets) and multiple symbol control words (i.e. multi-word control packets). In such an embodiment, for example, C1 and C2 in FIG. 5 may be two symbols belonging to a single control word (i.e. two words belonging to a two-word control packet).

In another embodiment, the protocol may be such that the low-latency control words include only single symbol control words (i.e. single-word control packets). In such an embodiment, for example, C1 may be a first single-symbol control word (i.e. a first single-word control packet), and C2 may be a second single-symbol control word (i.e. a second single-word control packet).

In accordance with another embodiment of the invention, the multi-lane link may have measurable latencies, and the designated lane may be a lane which is selected or optimized for low-latency. For example, the designated lane may be the lane which has the lowest latency of the multiple lanes of a link. The low-latency performance may be optimized by not having, or not using, a deskew buffer for the designated lane. In addition, preferential routing to the designated lane may be utilized to reduce skew.

In accordance with another embodiment of the invention, a predetermined category of words, such as low-latency control words, may be transmitted across the link using any available lane, rather than just a designated lane. In other words, the transmitter need not distinguish between words in determining the lane for transmission. Instead, all the words may be striped to the available lanes for transmission. As described below in relation to FIG. 8, in this embodiment, each lane of the receiver performs a check to determine whether a received word is of the predetermined category. This check is performed by each lane prior to the lane-to-lane deskew.

Figure 7:
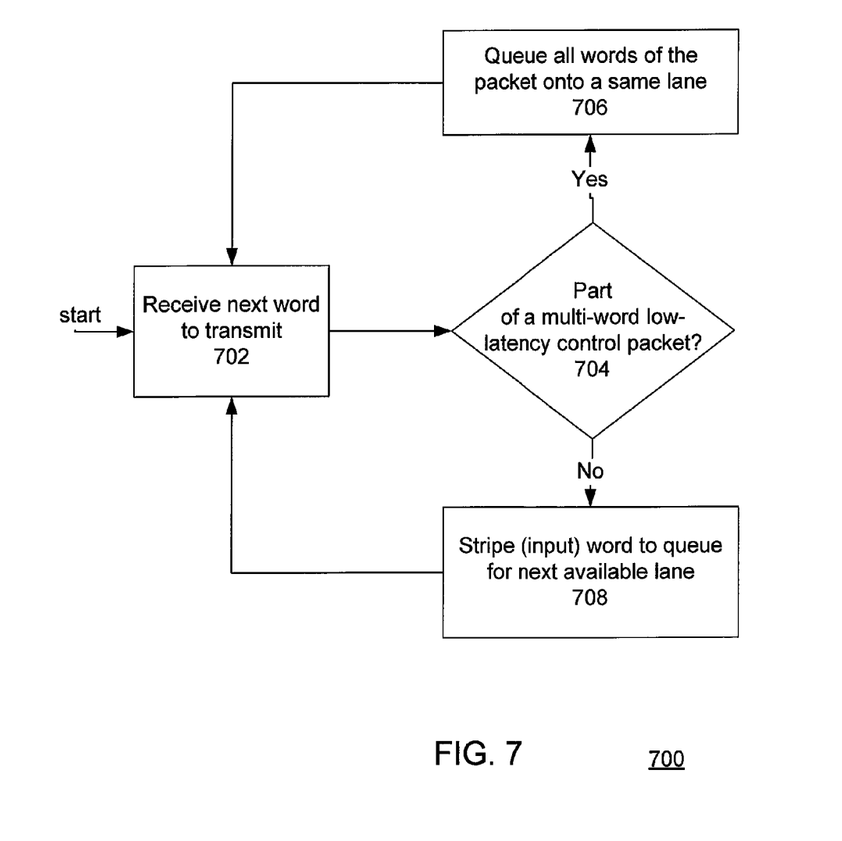
FIG. 7 is an exemplary flow chart showing a method for the low-latency transmission of a predetermined category of words, along with other words, across a multi-lane link in accordance with an embodiment of the invention.

FIG. 7 is a flow chart showing a method 700 for the low-latency transmission of a predetermined category of words, along with other words, across a multi-lane link in accordance with an embodiment of the invention. A transmitter controller 114 may be configured to perform the method 700.

As shown, a transmitter obtains 702 a next word to be transmitted across the multi-lane link. The word may, or may not, be of the predetermined category for low-latency transmission (i.e. may, or may not, be a low-latency word). A determination is made 704 as to whether or not the word is part of a multi-word low-latency control packet. For example, the word may be encoded such that the initial bits of the word may be examined to determine that the word is a control word (rather than a data word), and subsequent bits may be examined for control words to determine if it is part of a multi-word control packet.

If the word is part of a multi-word low-latency control packet, then the word is queued 706 onto a same lane as the other words of the same packet. This is so that the receiver may receive and interpret all words of the multi-word low-latency control packet without needing to perform a lane-to-lane deskew in between.

On the other hand, if the word is not part of a multi-word low-latency control packet, then the word is striped 708 to the queue for the next available lane. In other words, if the word is a data word, a non-low-latency control word, or a single-word low-latency control packet, then the word is striped 708 to the queue of the next available lane.

Figure 8:
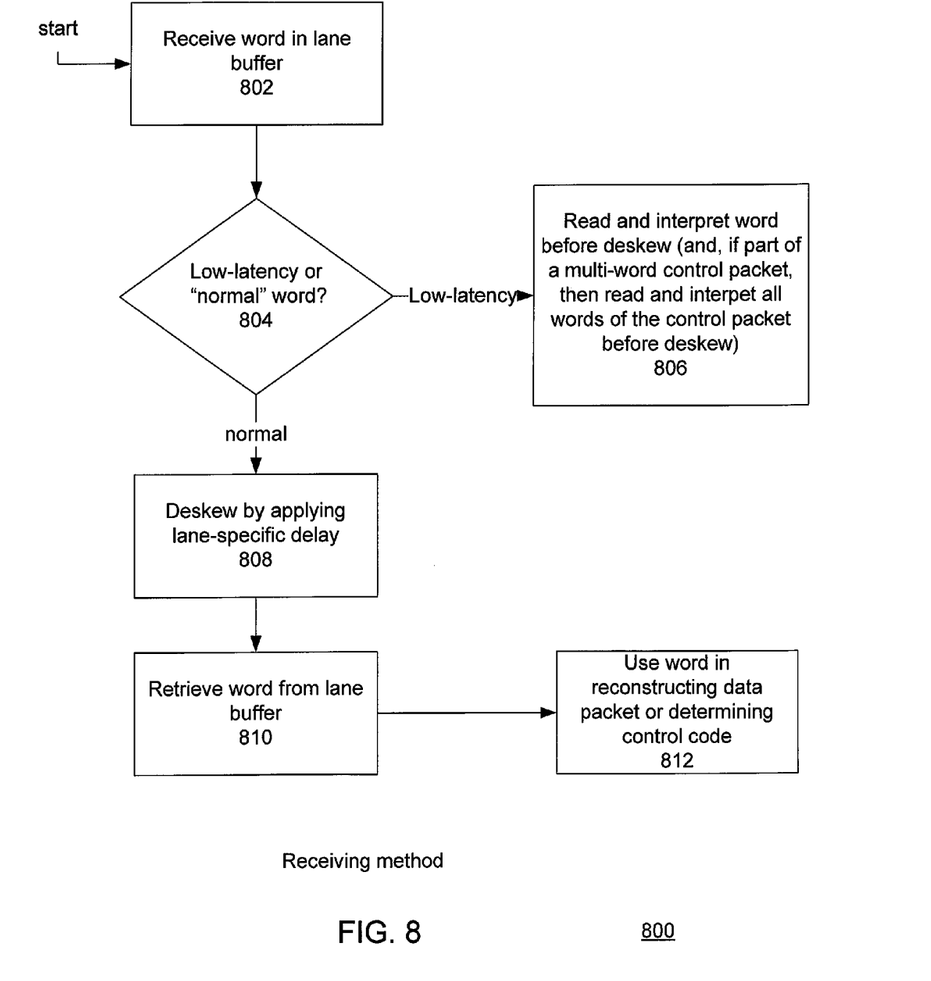
FIG. 8 is an exemplary flow chart depicting a method of receiving words that were transmitted over a lane of a multi-lane link per the method of FIG. 7 in accordance with an embodiment of the invention.

FIG. 8 is a flow chart depicting a method 800 of receiving words that were transmitted over a multi-lane link per the method 700 of FIG. 7 in accordance with an embodiment of the invention. This receiving method 800 may be performed by a receiver controller 124 and applies to words received in any lane, not just to words received in specially-designated lanes. As shown, the method 800 of FIG. 8 distinguishes between "low-latency" words and "normal" (non-low-latency) words at the receiver so as to be able to read and interpret the low-latency symbols with higher priority than the "normal" words.

As shown, a word is received 802 in the buffer for a lane (for example, any lane of the multi-lane link). However, before deskewing the lane delays, a determination 804 may be quickly made as to whether the word is a low-latency or normal word. The word may be encoded such that the initial bits of the word may be examined to determine the category to which the word belongs.

If the word is determined 804 to be a low-latency word, then the method 800 may proceed to pre-emptively read and interpret 806 the low-latency word without waiting until the lane-to-lane deskew is completed. This accelerated reading and interpretation of the low-latency word may be accomplished because all the low-latency words are received on a single designated lane. Hence, only word alignment within the single lane is needed, and not lane-to-lane deskew, before a low-latency word may be read and interpreted.

On the other hand, if the word is determined 804 to be a normal (i.e. non-low-latency) symbol, then the method 800 may proceed to apply 808 a lane-specific delay for purposes of lane-to-lane deskewing. Such lane-to-lane deskewing is necessary as the normal words may be received on multiple lanes. Thereafter, with the data in the lanes aligned, the normal word may be retrieved 810 from the buffer and subsequently used 812 in reconstructing a data packet or determining a control code. Hence, lane-to-lane deskew logic and buffering needs to be performed before normal words may be retrieved and used.

Figure 9:
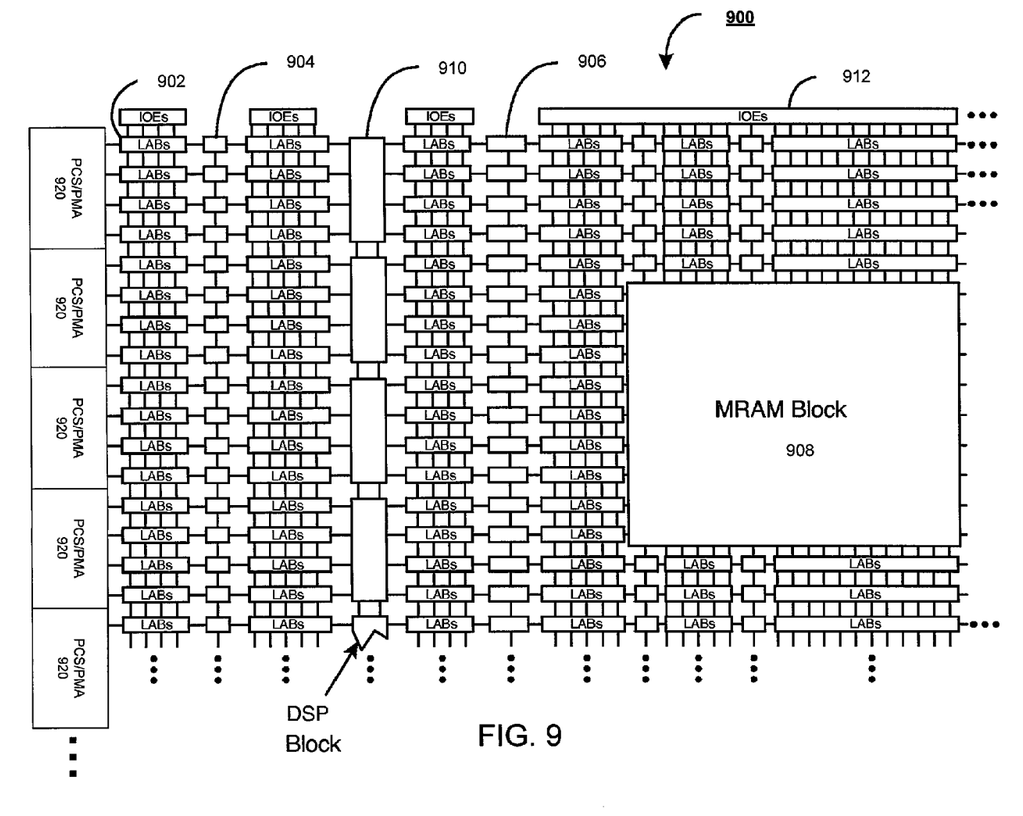
FIG. 9 is a simplified partial block diagram of a field programmable gate array (FPGA) that may be configured to implement an embodiment of the present invention.

FIG. 9 is a simplified partial block diagram of a field programmable gate array (FPGA) 900 that may be configured with circuitry to implement an embodiment of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 900 includes within its "core" a two-dimensional array of programmable logic array blocks (or LABs) 902 that are interconnected by a network of column and row interconnect conductors of varying length and speed. LABs 902 include multiple (e.g., 10) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 900 may also include a distributed memory structure including random access memory (RAM) blocks of varying sizes provided throughout the array. The RAM blocks include, for example, blocks 904, blocks 906, and block 908. These memory blocks can also include shift registers and FIFO buffers.

FPGA 900 may further include digital signal processing (DSP) blocks 910 that can implement, for example, multipliers with add or subtract features. Input/output elements (IOEs) 912 located, in this example, around the periphery of the chip support numerous single-ended and differential input/output standards. Each IOE 912 is coupled to an external terminal (i.e., a pin) of FPGA 900.

An array of PMA and PCS circuitry 920 may be included as shown, for example. The PCS circuitry generally provides digital logic functions which implement data communication protocols, while the PMA circuitry generally provides mixed (analog/digital) signal functionality for the data communications. For example, for certain protocols, the PCS circuitry may be configured to perform, among other functions, 8 bit-to-10 bit and/or 128 bit-to-130 bit encoding for data to be sent to the PMA circuitry and 10 bit-to-8 bit and/or 130 bit-to-128 bit decoding for data received from the PMA circuitry. The PMA circuitry may be configured to perform, among other functions, serialization of data to be transmitted (conversion from parallel to serial) and de-serialization of received data (conversion from serial to parallel).

A subset of the LABs 902 coupled to modules in the PMA/PCS array 920 may be configured to implement the methods and apparatus described above. Alternatively, the above-described methods and apparatus may be implemented using hardwired circuitry, or part configured LABs 902 and part hardwired circuitry.

It is to be understood that FPGA 900 is described herein for illustrative purposes only and that the present invention can be implemented in many different types of PLDs, FPGAs, and ASICs.

Figure 10:
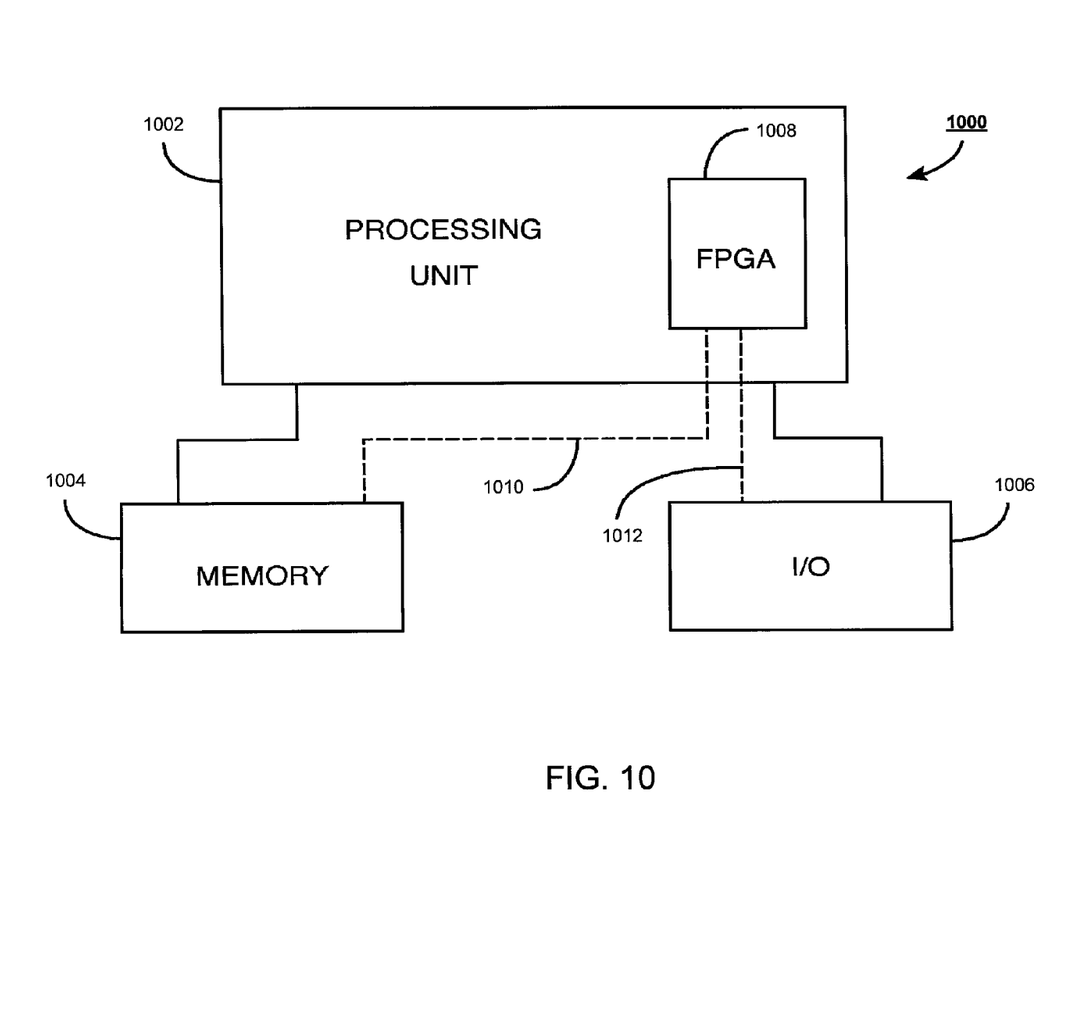
FIG. 10 shows a block diagram of an exemplary digital system that may be configured to utilize an embodiment of the present invention.

The present invention can also be implemented in a system that has a FPGA as one of several components. FIG. 10 shows a block diagram of an exemplary digital system 1000 that can embody techniques of the present invention. System 1000 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 1000 may be provided on a single board, on multiple boards, or within multiple enclosures.

System 1000 includes a processing unit 1002, a memory unit 1004, and an input/output (I/O) unit 1006 interconnected together by one or more buses. According to this exemplary embodiment, FPGA 1008 is embedded in processing unit 1002. FPGA 1008 can serve many different purposes within the system 1000. FPGA 1008 can, for example, be a logical building block of processing unit 1002, supporting its internal and external operations. FPGA 1008 is programmed to implement the logical functions necessary to carry on its particular role in system operation. FPGA 1008 can be specially coupled to memory 1004 through connection 1010 and to I/O unit 1006 through connection 1012.

Processing unit 1002 may direct data to an appropriate system component for processing or storage, execute a program stored in memory 1004, receive and transmit data via I/O unit 1006, or other similar function. Processing unit 1002 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 1008 may control the logical operations of the system. As another example, FPGA 1008 acts as a reconfigurable processor that may be reprogrammed as needed to handle a particular computing task. Alternately, FPGA 1008 may itself include an embedded microprocessor. Memory unit 1004 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. An integrated circuit configured to communicate a low-latency word category over a bi-directional multi-lane link, the integrated circuit comprising:
   a transmitter that transmits a first plurality of words over the multi-lane link to a receiver of another integrated circuit;
   a transmitter controller that sends words of the first plurality of words that belong to the low-latency word category only over a designated lane of the multi-lane link and stripes words of the first plurality of words that belong to non-low-latency word categories over next available lanes of the multi-lane link;
   a receiver that receives a second plurality of words over the multi-lane link from a transmitter of the other integrated circuit; and
   a receiver controller that
      determines a word category of a word in the second plurality of words,
      responsive to a determination that the word is of the low-latency word category, reads the word from the designated lane before lane-to-lane deskew is completed, and
      responsive to a determination that the word is of a non-low-latency word category, reads the word received from the designated lane after lane-to-lane deskew is completed.

2. The integrated circuit of claim 1, wherein the low-latency word category comprises control words.

3. The integrated circuit of claim 2, wherein the control words are utilized by higher layer protocols.

4. The integrated circuit of claim 2, wherein the non-low-latency word categories comprises data words.

5. The integrated circuit of claim 2, wherein the low-latency word category includes control words from shorter control codes, and wherein the non-low-latency word categories include control words from longer control codes.

6. The integrated circuit of claim 2, wherein the low-latency word category comprises single-word control codes.

7. The integrated circuit of claim 6, wherein the low-latency word category includes multiple-word control codes.

8. The integrated circuit of claim 1, wherein the receiver controller is further configured to read words of the second plurality of words that are received over lanes other than the designated lane after lane-to-lane deskew is completed.

9. The integrated circuit of claim 1, wherein the lanes of the multi-lane link have measurable latencies, and wherein the designated lane is configured for low-latency.

10. The integrated circuit of claim 9, wherein the designated lane is configured for low-latency by not using a deskew buffer.

11. The integrated circuit of claim 9, wherein the designated lane is configured for low-latency by preferential routing to reduce skew.

12. A method of utilizing a bi-directional multi-lane link, the method comprising:
   transmitting a first plurality of words, wherein words of the first plurality of words that belong to a predetermined word category are transmitted only over a designated lane of the multi-lane link;
   striping words of the first plurality of words that belong to other word categories, other than the predetermined category, onto next available lanes of the multi-lane link;
   determining a word category of a word in a second plurality of words received over the designated lane;
   responsive to a determination that the word is of the predetermined word category, reading the word from the designated lane before lane-to-lane deskew is completed; and
   responsive to a determination that the word is not of the predetermined word category, reading the word from the designated lane after lane-to-lane deskew is completed.

13. The method of claim 12, wherein the low-latency word category comprises control words.

14. The method of claim 13, wherein the control words are utilized by higher layer protocols.

15. The method of claim 13, wherein the non-low-latency word categories comprises data words.

16. The method of claim 13, wherein the low-latency word category includes control words from shorter control codes, and wherein the non-low-latency word categories include control words from longer control codes.

17. The method of claim 13, wherein the low-latency word category comprises single-word control codes.

18. The method of claim 17, wherein the low-latency word category includes multiple-word control codes.

19. The method of claim 12 further comprising:
   reading words of the second plurality of words that are received over lanes other than the designated lane after lane-to-lane deskew is completed.

20. The method of claim 12, wherein the lanes of the multi-lane link have measurable latencies, and wherein the designated lane is configured for low-latency.

21. The method of claim 20, wherein the designated lane is configured for low-latency by not using a deskew buffer.

22. The method of claim 20, wherein the designated lane is configured for low-latency by preferential routing to reduce skew.

23. A circuit configured for low-latency communication of a predetermined word category over a bi-directional multi-lane link, the circuit comprising:
   a local receiver that receives words over the multi-lane link from a remote transmitter; and
   a receiver controller that
      determines a word category of a word received over a lane,
      responsive to a determination that the word received is of the predetermined word category, reads the word from the lane before lane-to-lane deskew is completed, and
      responsive to a determination that the word received is not of the predetermined word category, reads the word from the lane after lane-to-lane deskew is completed.

24. The circuit of claim 23, wherein the lane is a designated lane, and wherein the words of the predetermined word category are only received over the designated lane.

25. The circuit of claim 23, wherein all words of a control packet that is a multi-word control packet are received and interpreted prior to the lane-to-lane deskew being completed.

* * * * *